United States Patent [19]

Oberländer

[11] Patent Number: 4,649,804
[45] Date of Patent: Mar. 17, 1987

[54] MECHANICAL RELEASE ARRANGEMENT FOR A FLUID-PRESSURE-OPERATED BRAKING CYLINDER

[75] Inventor: Andreas Oberländer, Hanover, Fed. Rep. of Germany

[73] Assignee: WABCO Westinghouse Steuerungstechnik GmbH & Co., Hanover, Fed. Rep. of Germany

[21] Appl. No.: 708,467

[22] Filed: Mar. 5, 1985

[30] Foreign Application Priority Data

Mar. 26, 1984 [DE] Fed. Rep. of Germany ....... 3411054

[51] Int. Cl.$^4$ .............................................. F01B 7/00
[52] U.S. Cl. .......................................... 92/63; 92/129; 92/130 A
[58] Field of Search ................... 92/63, 129, 130 A, 33

[56] References Cited

U.S. PATENT DOCUMENTS

| 3,719,125 | 3/1973 | Cannella | 92/63 |
|---|---|---|---|
| 3,782,251 | 1/1974 | Le Marhand | 92/63 |
| 4,364,305 | 12/1982 | Dalibout | 92/63 |
| 4,472,995 | 9/1984 | Persson | 92/63 |
| 4,478,319 | 10/1984 | Casalone | 92/63 |
| 4,493,246 | 1/1985 | Dalibout | 92/63 |

Primary Examiner—Abraham Hershkovitz
Attorney, Agent, or Firm—G. E. Hawranko

[57] ABSTRACT

A mechanical release arrangement for a fluid-pressure-operated braking cylinder having an emergency brake/parking brake feature includes a cylinder housing having formed therein a brake actuation portion, an emergency portion, an intermediate lever portion, and a coaxially-disposed brake-release arrangement interacting therewith. An actuator piston is movable within one pressure chamber and has a hollow rod portion extending therefrom on which the lever arrangement is secured. An emergency piston is retracted to a release position against the force of a spring arrangement by fluid pressure communicated to an emergency chamber. An extension sleeve extends from the emergency piston and has a first toothed portion formed at one end. A release rod extends through the extension sleeve and has a second toothed portion formed near a reduced diameter end. An annular collar formed at the middle of the release rod contacts the hollow rod portion to transmit emergency braking force to the lever arrangement thereby when the first and second toothed portions are in an abutting contacting engagement. To release the brake following an emergency application, a release body can be activated to rotate the release rod such that the first and second toothed portions align in a mated position allowing independent relative movement between the release rod and emergency piston. A restoring arrangement returns the release rod to the original position upon repressurization of the emergency chamber.

14 Claims, 2 Drawing Figures

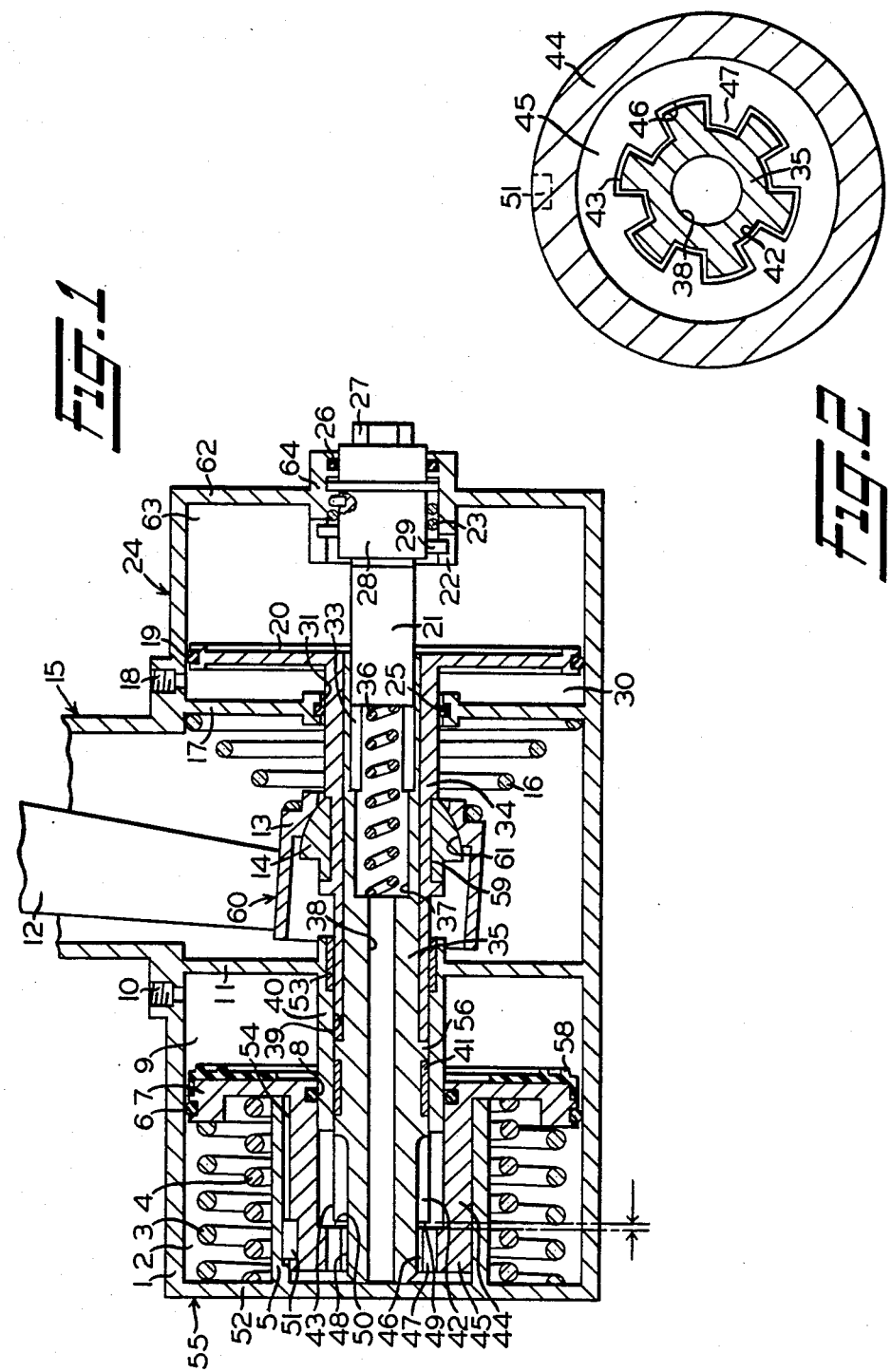

MECHANICAL RELEASE ARRANGEMENT FOR A FLUID-PRESSURE-OPERATED BRAKING CYLINDER

BACKGROUND OF THE INVENTION

This invention relates to a mechanical release arrangement for a fluid-pressure-operated braking cylinder having an emergency brake/parking brake feature, such a brake cylinder as can be used in motor vehicle brake systems. A number of known mechanical brake release arrangements typically have required a large number of components, the majority of which had to be manufactured to precise tolerances. Additionally, such arrangements were designed such that the release portion components, which bridged the emergency portion and the brake actuating portion of the system, were subjected to excessive shear forces which, as a consequence, forced maintenance and repair expenditures higher.

An example of such a release arrangement can be found in German Pat. DE No. 22 09 570. In this arrangement, a sleeve connected to a piston has a longitudinal slit running the approximate length thereof, and further, has a transverse slit intersecting the longitudinal slit at a point along the circumference of the sleeve. A cam is secured to a piston rod such that, the cam is movable in the manner of a bayonet closing within the longitudinal slit of the sleeve during release conditions. The piston rod, cam arrangement is prevented from axial movement relative to the sleeve and piston during normal brake operating conditions due to the engagement of the cam within the transverse slit at this time; such engagement allowing coincident movement of the piston rod with the piston and sleeve configuration. This engagement between the cam and the transverse slit on the sleeve, however, has resulted in the disadvantage of a significant shear force exhibited on the respective components at what is a relatively small contact surface area. This disadvantage has proven costly in terms of component wear, maintenance, and repair.

SUMMARY OF THE INVENTION

It is, therefore, an object of the invention to provide a mechanical release arrangement for a fluid-pressure-operated brake cylinder which can be manufactured at minimum cost levels with respect to the quantity of components and the operation of machining those components.

It is a further object to provide such a mechanical release arrangement whereby the components utilized for the release operation interact in such a manner as to substantially reduce the shear forces which are experienced at the point of contact between the respective engaged components.

It is yet a further object of the invention to provide a mechanical release arrangement whereby the releasing force required to overcome the "nonreleased" or locked condition between the engaged components, in order to effect a brake release, are reduced as a result of distributing such locked-up energy over a large circumferential area.

Briefly, the invention consists of a brake cylinder housing having a brake actuation portion and an emergency/parking brake portion with a brake release arrangement interacting therebetween. An actuator piston having a hollow rod portion which extends partially into a parking brake portion is reciprocally movable in the brake actuator portion. A release rod extends into the parking brake portion and slidably-fits partially within the hollow rod portion and, by means of a collar formed near the middle of the release rod, is in abutting contact with one end of the hollow piston rod. The release rod, at the end disposed in the parking brake portion, exhibits a plurality of teeth-like rises and depressions around the outer circumference. An emergency piston, having an extension sleeve in a displaced coaxially surrounding relation to a portion of the release rod, has a second plurality of teeth-like rises and depressions formed on the inner circumference. The respective pluralities of rises and depressions of the emergency piston and the release rod are situated in an opposed abutting relation under normal brake operating conditions such that, the release rod moves with the emergency piston. Under a release operation, the respective raised and depressed portions are twisted into an engaged mating position such that, the emergency piston can move independent of movement of the release rod. A release body is externally accessible for manual operation and engages the release rod such that, the release rod can be rotated to effect the engaged mated condition necessary for the release operation. An actuator lever can be attached by means of an angularly-sloped collar to the hollow piston rod such that, movement of the actuator piston results in the desired release or application of the brake lever. A bias spring engages the brake lever to urge the brake lever in the release position when the actuator piston is not pressurized.

BRIEF DESCRIPTION OF THE DRAWINGS

FIG. 1 is an elevational view, in section, of a mechanical release arrangement of a fluid-pressure-operated brake cylinder constructed in accordance with the invention.

FIG. 2 is a sectional view of the toothed portions of the rod and sleeve in a mated engagement.

DESCRIPTION AND OPERATION

As seen in FIG. 1, the mechanical release arrangement for a brake cylinder having a parking brake/emergency brake feature is contained primarily within a brake cylinder housing 1. The brake cylinder housing 1 essentially consists of a brake actuation portion 24, a lever portion 15, and a parking brake, emergency brake portion 55 with a mechanical release arrangement coaxially disposed there- between.

In the emergency portion 55, there is a first piston 7, which on the side facing the brake actuation portion 24 is acted on fluid pressure from a first pressure chamber 9 and on the opposite side faces a spring chamber 2. A piston seal 6 is disposed on the first piston 7 to seal between the first pressure chamber 9 and the spring chamber 2. The first pressure chamber 9 can be put into communication with a fluid pressure source (not shown) by means of a first pressure inlet 10. The first pressure chamber 9 is separated from the lever portion 15 by a first wall portion 11 in which is formed a centrally disposed first recess 39. A first tubular portion 40 extends through the centrally-located first recess 39 and occupies a portion of the emergency brake portion 55 and the lever portion 15. Contacting the first piston 7, within the spring chamber 2, are first and second spring members 3, 4 which exert an emergency braking force upon the evacuation of the first pressure chamber 9 to urge the first piston 7 in a rightward direction toward the first pressure chamber 9.

Extending from the first piston 7, in the direction of the spring chamber 2, is a hollow extension sleeve 44 which slidably-fits over at least a portion of the first tubular portion 40 which is disposed in a first pressure chamber 9. A first sealing gasket 8 is disposed on the inner circumference of the first piston 7 such that, the first piston 7 is supported in a sealed manner over the first tubular portion 40.

A first end 52 of the cylinder housing 1 acts as a spring seat for the first and second spring members 3, 4. A centrally disposed second tubular portion 5 extends from the first end 52 into at least a portion of the spring chamber 2 in a surrounding coaxial relation to the extension sleeve 44 of the first piston 7. The second tubular portion 5 is of a larger diameter and, in fact, extends over a portion of the first tubular portion 40 with the extension sleeve portion 44 slidably-moving between the overlapped tubular portions 40, 5. To insure that the first piston 7 moves only in an axial direction, a slide member 51, secured to the extension sleeve 44, slidably-moves within a recess slot 54 formed in a longitudinal direction on the inner surface of the second tubular portion 5.

Forming a part of the mechanical release arrangement is a release rod 35 which is coaxially-disposed in the cylinder housing 1 in a longitudinally extending manner such that, one end occupies a portion of the emergency brake portion 55 and the other end lies within the brake actuation portion 24. Formed on the release rod 35 and lying within the emergency brake portion 55 is an annular collar portion 56 which is in sliding contact with the inner surface of the first tubular portion 40. The annular collar portion 56 is of a larger diameter than the remaining portion of the release rod 35, and furthermore, exhibits a second sealing gasket 41 disposed within the annular collar portion 56 such that a sealing arrangement exists between the annular collar 56 and the first tubular portion 40.

Formed on the release rod 35, at a point starting from the annular collar 56 and extending toward the first end 52, is a first plurality of tooth-shaped rises and depressions 43, 42 This first plurality of rises and depressions 43, 42 extend to a point short of the end of the release rod 35 adjacent the first end 52 such that, a first stop portion 49 is formed and a reduced diameter rod segment 48 results therefrom to the end of the release rod 35.

Formed on the inner circumference of the end of the extension sleeve 44, adjacent the first end 52, is a second plurality of tooth-shaped rises and depressions 47, 46. This second plurality of rises and depressions 47 46 are formed on an annular ring 45 which extends radially inward toward the release rod 35 for a length approximately equivalent to the length of the reduced diameter rod segment 48 of the release rod 35. In this manner, it can be appreciated that, with the first piston 7 in the fully retracted position, the first plurality of rises and depressions 43, 42 and the second plurality of rises and depressions 47, 46 can be oriented in an opposing disengaged position. Similar to the first stop segment 49, formed on the first plurality of rises and depressions 43, 42, is a second stop segment 50 formed on the second plurality of rises and depressions 47, 46 in an opposing face-to-face relation with the first stop 49.

This reduced diameter rod segment 48, corresponding nearly in length to the length of the second plurality of rises and depressions 47, 46, provides a spacing, as shown in FIG. 1, between the release rod 35 and extension sleeve 44 which results in the respective first and second stop portions 49, 50 lying opposite one another so that at times, the first and second stop portions 49, 50 can contact and allow coincident movement of the release rod 35 and first piston 7.

In the brake actuation portion 24, there is a second piston or actuator piston 20 equipped with a third sealing gasket 19, which second piston 20 borders a second pressure chamber 30 having a second pressure inlet 18 which can be in communication with a fluid pressure source (not shown). A second wall segment 17 separates the second pressure chamber 30 from the lever portion 15 of the cylinder housing 1. Formed on the second piston 20 is a hollow piston rod 34 which extends through a second recess 31 formed in the second wall portion 17, through the lever portion 15, and into the emergency braking portion 55. A slide bushing 53 is disposed in the first tubular portion 40 such that, the hollow piston rod 34 can extend into the emergency portion 55 in a sliding manner. A third sealing gasket 25 is disposed in the second recess to seal the second pressure chamber 30 from the lever portion 15.

As seen in FIG. 1, the hollow piston rod 34 is of an inner diameter which allows a telescopic sliding contact of the hollow piston rod 34 with the portion of the release rod 35 extending from the annular collar 56 toward the brake actuation portion 24. The end of the hollow piston rod 34 contacts the annular collar 56 of the release rod 35 in an abutting manner such that, movement of the release rod 35 in a brake-applying or rightward direction results in movement of the second piston 20 independent of pressurization of the second pressure chamber 30.

Secured to a slotted portion 59 of the hollow piston rod 34, which is movable within the intermediate lever portion 15 of the cylinder housing 1, is a lever arrangement shown generally at 60. The lever arrangement 60 includes a compression spring 16, which is braced against the opposing side of the second wall portion 17 as the second pressure chamber 30 presses against a sleeve body 13, which is connected with a brake lever 12. The sleeve body 13 is located coaxially with a thrust collar 14 which has an outwardly, angularly-sloped surface engaging an inwardly-sloped surface 61 of the sleeve body 13. On the inner surface of the thrust collar 14, an essentially flat surface fits into the slotted portion 59 of the hollow piston rod 34 for coincident movement therewith. The brake lever 12 connects to the sleeve body 13 and extends outwardly of the cylinder housing 1 for attachment thereto.

Adjacent the side of the second piston 20, opposite the second pressure chamber 30, is an atmospheric chamber 63 which is bounded on another side by a second cylinder end 62. Formed coaxially in the second cylinder end 62 is a third tubular portion 64 formed such that a portion of this tubular portion 64 extends into the atmospheric chamber 63. A release body 28 fits essentially within the third tubular portion 64 and has a hexagonal surface 27 extending outwardly of the cylinder housing 1 for manipulation of the release body 28 by the use of a tool (not shown).

Coaxially extending from the release body 28 into the atmospheric chamber 63 and through the hollow piston rod 34, is a squared surface 21 which is rotatable upon manipulation of the release body 28. The squared surface 21 extends through the hollow piston rod 34 a distance sufficient to engage an inner slotted surface 33 formed as a part of a graduated throughbore 38 extending through the release rod 35.

The inner slotted surface 33 is a mated equivalent to the squared surface 21 and allows for sliding axial movement of the release rod 35 relative to the fixed position of the release body 28, squared surface 21 arrangement, and as well, prevents relative rotational movement between the respective elements. In a first graduated portion 37 of the graduated throughbore 38 of the release rod 35, a bias spring 36 is braced against the release body 28 and which urges the release rod 35 in a direction of the first cylinder end 52 of the cylinder housing 1.

Disposed between the third tubular portion 64 and the release body 28, there is a torsion spring 23, which is connected with the third tubular portion 64 and the release body 28 in such a way that, after a twisting motion of the release body 28, and thus also of the release rod 35, the torsion spring 23 urges the release body 28 and the release rod 35 which is connected thereto, back to its initial position. A pin 29 introduced radially in the end region of the release body 28, which is guided in a spiral slot 22 of the third tubular portion 64, together with the wall bordering the spiral slot 22 in the circumferential direction, serve as a stop against excessive rotational movement of the release body 28. The position of the release rod 35 is fixed by this stop, in which position, the end surfaces of the first plurality of rises and depressions 42, 43 of the release rod 35, and the second plurality of rises and depressions 46, 47 of the extension sleeve 44, lie opposite one another.

In the portion of the third tubular portion 64 projecting out of the cylinder housing 1, there is a fourth sealing gasket 26 for the release body 28, which prevents the penetration of dirt and moisture into the atmospheric chamber 63.

FIG. 2 shows a cross-section through the respective first and second pluralities of rises and depressions 42, 43, 46, 47 of the release rod 35 and the extension sleeve 44. In the extension sleeve 44 of the first piston 7, provided with a recess 54 to accept the slide 51, the release rod 35 is located so that it can move in the axial direction. The extension sleeve 44 exhibits an annular ring 45 extending radially inward toward the release rod 35. Also in the illustration, the second plurality of rises and depressions 46, 47 formed on the annular ring 45 and the first plurality of rises and depressions 42, 43 of the release rod 35, are represented so that the raised areas 43 of the release rod 35 reside in the depressions 46 of the extension sleeve 44, and conversely, the raised areas 47 of the extension sleeve 44 reside in the lowered depressions 42 of the release rod 35. In this position, the first piston 7 and the release rod 35 can be moved relative to one another only in the axial direction.

In operation, the mechanical release arrangement for use with a brake cylinder having an emergency brake/parking brake feature, as shown in FIG. 1, is in the brake-release condition, whereby the first pressure chamber 9 is pressurized and the second pressure chamber 30 is vented. Under this pressurization scheme, the first piston 7 is held in its left-limit position by the fluid pressure. The first and second compression springs 3 and 4 are thus under tension. The second piston 20 of the brake actuation portion 24, connected with the hollow piston rod 34, is also held in its left-limit position by the compression spring 16 acting on the sleeve body 13, the thrust collar 14, and the hollow piston rod 34. The brake lever 12 is therefore held in the left-hand, or release position, by means of the connection to the hollow piston rod 34.

To effect a brake application, fluid pressure is admitted into the second pressure chamber 30, and the second piston 20 will move against the force of the corresponding compression spring 16, to the right, thereby urging the hollow piston rod 34 along therewith it. By means of the thrust collar 14 and the sleeve body 13 acting together with the hollow piston rod 34, the brake lever 12 is moved in the rightward, or brake-application direction. In contrast to the previously-discussed brake-release condition, whereby the hollow piston rod 34 remains in abutting contact with the annular collar 56 of the release rod 35, on account of the force of the bias spring 36, located in the first graduated portion 37, the release rod 35 remains in its left-limit position. Since the release rod 35 and the hollow piston rod 34 can be moved relative to one another in the rightward direction, under conditions of the first pressure chamber 9 being pressurized, the release rod 35, as well as the first piston 7, remain in the left-limit position.

If it is desired to again effect a brake release, the second pressure chamber 30 is vented, resulting in the compression spring 16 acting on the sleeve body 13 to urge the sleeve body 13, brake lever 12, thrust collar 14, and hollow piston rod 34 in the leftward, or release direction.

If, during a brake release situation, a defect in the pressure supply line arises, the emergency brake portion 55 will come into operation as a result of the first pressure chamber 9 being vented by such defect. Ventilation of the first pressure chamber 9 allows the first and second spring members 3, 4 to act on the first piston 7, moving the first piston 7 in the rightward or brake-application direction. As previously discussed, under normal operating conditions, the first and second pluralities of rises and depressions 42, 43, 46, 47 are oriented, by means of the torsion spring 23 preconditioning the position of release rod 35, such that the respective rises 43, 47 oppose one another as well as the respective depressions 42, 46 opposing one another. In this manner, the first stop 49 formed on release rod 35 and the second stop 50 formed on the extension sleeve 44, will contact in an abutting manner and the rightward movement of the first piston 7 will effect rightward movement of the release rod 35 as well.

By means of the annular collar 56, located on the release rod 35, being in abutting contact with the hollow rod portion 34, the hollow rod portion 34 is taken along with the release rod 35, and thus, the brake lever 12 is also moved in the braking direction as a result of the lever arrangement consisting of the thrust piece 14 which is located on the hollow piston rod 34 and the sleeve body 13.

In order to release the brake once the brake has been set by the emergency braking portion, the release body 28, provided with the hexagonal surface 27, must be twisted against the force of the torsion spring 23. The release rod 35, connected with the release body 28 by means of the squared surface 21, is thereby rotated along with the release body 28, until the first plurality of rises and depressions 42, 43 of the release rod are aligned in a mated position with the second plurality of rises and depressions 46, 47 of the extension sleeve 44. It can be appreciated that the force that must be overcome to twist the release rod, is that spring force being exerted by the second stop portion 50 of each raised tooth portion 47 on the second stop portion 49 on each raised tooth portion 43. By distributing this spring force over a larger area, the twisting force needed to overcome the spring force is reduced. The first piston 7, which includes the extension sleeve 44, is then again urged in the rightward direction by the force of the first and second compression springs 3, 4 until the first piston 7 contacts the first wall portion 11. A damping element 58 can be disposed on the first piston 7 to prevent an excessively severe impact of the first piston 7 against the first wall portion 11.

Upon the mated orientation of the first and second pluralities of tooth-like rises and depressions 42, 43, 46, 47, the first piston 7 and the release rod 35 can move independently of one another thereby allowing free movement of the release rod 35 and hollow rod portion 34. Independent movement of the hollow rod portion 34 encompasses therewith independent movement of the thrust collar 14, the sleeve body 13, and the brake lever 12.

To return to a normal braking operation following an emergency application, fluid pressure must again be introduced to the first pressure chamber 9, thus urging the first piston 7 rightward against the force of the first and second spring members 3, 4. The first piston 7 will continue this rightward movement until contact is made with the second tubular portion 5 which acts as a stop for the first piston 7. At this stopped position, the second plurality of rises and depressions 46, 47 reside over the reduced diameter rod portion 48 such that, the mated orientation of the first and second pluralities of rises and depressions ceases and the restraining force exerted by the nonrotating first piston 7 on the release rod 35 is removed. The release rod 35 is then free to rotate to the normal position under the influence of the torsion spring 23. In this normal release rod position, respective first and second stop portions 49, 50 again face one another in an offset manner. The brake cylinder is once again in the normal operating position.

Although the hereinabove-described embodiment of the invention constitutes a preferred form, it can be appreciated that other modifications can be made thereto without departing from the scope of the invention as set forth in the appended claims. As an example, an alternative mating arrangement between the release rod 35 and release body 28 can be provided. Additionally, the arrangement for twisting the release body 28, upon the occurrence of a pressure line defect, can be of an automatic method as opposed to the described tool manipulation method.

I claim:

1. A mechanical release arrangement for a fluid-pressure-operated braking cylinder having an emergency braking feature comprising:
   (a) a cylinder housing having a brake actuation portion and an emergency portion included therein and formed at opposite ends of said cylinder housing;
   (b) an actuator piston reciprocally movable within a first pressure chamber formed in said brake actuation portion, said actuator piston having a hollow rod portion extending coaxially therefrom toward said emergency portion;
   (c) lever means connected to said actuator piston for transmitting such actuator piston movement externally of said cylinder housing;
   (d) an emergency piston movable within a second pressure chamber formed in said emergency portion in a first direction corresponding to an emergency application and in a second direction, upon pressurization of said second pressure chamber, corresponding to an emergency release, said emergency piston having a sleeve extension coaxially formed thereon;
   (e) spring means disposed adjacent said emergency piston for exerting a spring force and urging said emergency piston in such first direction upon ventilation of said second pressure chamber;
   (f) a release rod having a first end coaxially extending at least partially through said extension sleeve, a middle portion in contact, at times, with at least a portion of said hollow rod portion, and a second end extending into said brake actuation portion;
   (g) force-communicating means disposed in said emergency portion and having a first toothed portion formed on said extension sleeve and a second toothed portion formed on said first end of said release rod engageable in an abutting contacting manner with said first toothed portion for transmitting such spring force to said actuator piston upon ventilation of such fluid pressure from said second pressure chamber, said first and second toothed portions further being engageable into a mated condition upon rotation of said release rod, such engaged mated condition corresponding to a brake release condition where an overlapping occurs between said first and second toothed portions which allows movement of said release rod independent of movement of said emergency piston;
   (h) a release body connected to said second end of said release rod and extending outwardly of said cylinder housing such that, operation thereof effects such rotation of said release rod to thereby transmit a torsional force through said release rod to move said first and second toothed portions into such mated condition; and
   (i) restoring means connected to said release rod for returning said release rod to an original position corresponding to such engaged abutting contact between said first and second toothed portions upon restoration of fluid pressure to said second pressure chamber.

2. A mechanical release arrangement for a fluid-pressure-operated braking cylinder, as set forth in claim 1, wherein said first toothed portion includes a first plurality of equidistantly-spaced rises and depressions of substantially equivalent dimension formed around the inner circumference of said extension sleeve and said second toothed portion includes a second plurality of equidistantly-spaced rises and depressions formed along a portion of the outer circumference of said release rod, said first plurality of rises and depressions being sized such that, said first plurality of rises can overlap said second plurality of depressions and said second plurality of rises can overlap said first plurality of depressions.

3. A mechanical release arrangement for a fluid-pressure-operated braking cylinder, as set forth in claim 2, wherein said release rod further includes a reduced diameter rod portion formed on said first end, said first toothed portion of said extension sleeve coaxially-displaced in a surrounding manner relative to said reduced diameter rod portion when said second pressure chamber is pressurized.

4. A mechanical release arrangement for a fluid-pressure-operated braking cylinder, as set forth in claim 1, wherein said restoring means includes a torsion spring connected on one end to said cylinder housing and, on the opposite end, to said release body, said torsion spring being prestressed so as to urge said release rod to such returned original position.

5. A mechanical release arrangement for a fluid-pressure-operated braking cylinder, as set forth in claim 3, wherein said force-transmitting means further includes a slot formed in a tubular portion of said cylinder housing coaxially-surrounding said extension sleeve and a pin member secured to said extension sleeve, said pin member being restrained to an axial movement within said slot during movement of said emergency piston such that said emergency piston is prevented from rotating thereby.

6. A mechanical release arrangement for a fluid-pressure-operated braking cylinder, as set forth in claim 3, wherein said force-transmitting means further includes a first stop portion formed at an inner edge of said first toothed portion and a second stop portion formed at an outer edge of said second toothed portion in opposing relation to said first stop portion, said first stop and said second stop being engaged in abutting contact during movement of said emergency piston in such first direction.

7. A mechanical release arrangement for a fluid-pressure-operated braking cylinder, as set forth in claim 4, wherein said restoring means further includes a squared body secured to said release body and disposed between said release body and said release rod, said squared body being slidably-connected to a mated inner squared surface formed within said second end of said release rod, said release rod further having formed therein, a graduated throughbore in which a bias spring is seated between a first graduation and said squared body such that, said bias spring urges said release rod in a direction toward said emergency portion of said cylinder housing.

8. A mechanical release arrangement for a fluid-pressure-operated braking cylinder, as set forth in claim 1, wherein said middle portion of said release rod is an annular collar formed on said release rod adjacent said second toothed portion, said annular collar slidably-fitting within a second tubular portion of said cylinder housing, said hollow rod portion being of substantially equal diameter as said annular collar and further being slidably mounted on said release rod a distance from said second end up to said annular collar.

9. A mechanical release arrangement for a fluid-pressure-operated braking cylinder, as set forth in claim 1, wherein said lever means includes a rod slot formed on said hollow piston rod, an angularly-sloped thrust collar secured within said rod slot, an annular sleeve body coaxially-surrounding and contacting said angularly-sloped thrust collar, a lever secured to said sleeve body and extending externally of said cylinder housing, and a compression spring contacting said sleeve body and urging said lever means in a brake-release position against the force of said actuator piston.

10. A mechanical release arrangement for a fluid-pressure-operated braking cylinder, as set forth in claim 1, wherein said spring means includes first and second spring members coaxially-disposed within said emergency portion and seated against one end of said cylinder housing, said first and second spring members contacting a side of said emergency piston opposite said second pressure chamber to effect movement of said emergency piston in such first direction.

11. A mechanical release arrangement for a fluid-pressure-operated braking cylinder, as set forth in claim 5, wherein said restoring means includes a torsion spring connected on one end to said cylinder housing and, on the opposite end, to said release body, said torsion spring being prestressed so as to urge said release rod to such returned original position.

12. A mechanical release arrangement for a fluid-pressure-operated braking cylinder, as set forth in claim 11, wherein said restoring means further includes a squared body secured to said release body and disposed between said release body and said release rod, said squared body being slidably-connected to a mated inner squared surface formed within said second end of said release rod, said release rod further having formed therein, a graduated throughbore in which a bias spring is seated between a first graduation and said squared body such that, said bias spring urges said release rod in a direction toward said emergency portion of said cylinder housing.

13. A mechanical release arrangement for a fluid-pressure-operated braking cylinder, as set forth in claim 12, wherein said lever means includes a rod slot formed on said hollow piston rod, an angularly-sloped thrust collar secured within said rod slot, an annular sleeve body coaxially-surrounding and contacting said angularly-sloped thrust collar, a lever secured to said sleeve body and extending externally of said cylinder housing, and a compression spring contacting said sleeve body and urging said lever means in a brake-release position against the force of said actuator piston.

14. A mechanical release arrangement for a fluid-pressure-operated braking cylinder, as set forth in claim 13, wherein said spring means includes first and second spring members coaxially-disposed within said emergency portion and seated against one end of said cylinder housing, said first and second spring members contacting a side of said emergency piston opposite said second pressure chamber to effect movement of said emergency piston in such first direction.

* * * * *